United States Patent
Hall et al.

(10) Patent No.: US 12,289,011 B2
(45) Date of Patent: Apr. 29, 2025

(54) AGGREGATING UNUSED POWER IN A FACILITY

(71) Applicant: Equinix, Inc., Redwood City, CA (US)

(72) Inventors: David James Asher Hall, London (GB); David Buck Mar, San Jose, CA (US); Tikhon Suresh Pichai, Simpsonville, SC (US); Douglas James Asay, San Jose, CA (US); My Dinh Truong, Pacifica, CA (US)

(73) Assignee: Equinix, Inc., Redwood City, CA (US)

( * ) Notice: Subject to any disclaimer, the term of this patent is extended or adjusted under 35 U.S.C. 154(b) by 567 days.

(21) Appl. No.: 17/651,378

(22) Filed: Feb. 16, 2022

(65) Prior Publication Data
US 2023/0261480 A1 Aug. 17, 2023

(51) Int. Cl.
*H02J 9/06* (2006.01)
*G06F 1/26* (2006.01)
(Continued)

(52) U.S. Cl.
CPC .............. *H02J 9/061* (2013.01); *G06F 1/26* (2013.01); *G06F 1/263* (2013.01); *G06F 1/3203* (2013.01);
(Continued)

(58) Field of Classification Search
CPC .... H02J 3/381; H02J 2300/24; H02J 2310/16; H02J 7/34; H02J 7/35; H02J 1/102;
(Continued)

(56) References Cited

U.S. PATENT DOCUMENTS 9,680,390 B1 * 6/2017 Rose .................. H02J 9/06
10,014,717 B2 7/2018 Wang et al.
(Continued)

FOREIGN PATENT DOCUMENTS

CN 104682375 A 6/2015
CN 106300325 A 1/2017
(Continued)

OTHER PUBLICATIONS

International Search Report and Written Opinion of International Application No. PCT/US2023/061690 dated Jun. 13, 2023, 15 pp.
(Continued)

*Primary Examiner* — Ryan Johnson
(74) *Attorney, Agent, or Firm* — Shumaker & Sieffert, P.A.

(57) ABSTRACT

A power supply system includes a multitude of independent electrical systems each comprising one or more power blocks, wherein each power block is configured to provide a respective power output and a converter comprising a multitude of inputs coupled to the multitude independent electrical systems and comprising a multitude of outputs coupled to a multitude of independent loads, the converter configured to aggregate the power output of each of the multitude of independent electrical systems and to output direct current (DC) power to the multitude of independent loads through the multitude of outputs based on the aggregated power output. The power supply system includes a power controller coupled to the converter and configured to allocate power to each of the multitude of independent loads based on input power from each of the multitude of independent electrical systems and power consumption from each of the multitude of independent loads.

20 Claims, 6 Drawing Sheets

(51) Int. Cl.
*G06F 1/3203* (2019.01)
*H02J 1/10* (2006.01)
*H02J 1/14* (2006.01)

(52) U.S. Cl.
CPC ............... *H02J 1/106* (2020.01); *H02J 1/14* (2013.01); *H02J 9/062* (2013.01); *H02J 2310/16* (2020.01)

(58) Field of Classification Search
CPC ...... H02J 1/106; H02J 3/38; H02J 3/02; H02J 9/061; H02J 9/062; G06F 1/26; G06F 1/3203; Y02B 10/70; Y02B 90/20; Y04S 20/12
See application file for complete search history.

(56) References Cited

U.S. PATENT DOCUMENTS

| | | |
|---|---|---|
| 11,031,706 B1 | 6/2021 | Corhodzic |
| 2005/0071092 A1* | 3/2005 | Farkas ..................... G06F 1/26 702/60 |
| 2007/0016811 A1 | 1/2007 | Suzuki et al. |
| 2011/0187197 A1* | 8/2011 | Moth ..................... H02J 9/062 307/66 |
| 2012/0326504 A1 | 12/2012 | Ballantine et al. |
| 2013/0054987 A1* | 2/2013 | Pfeiffer ..................... H02J 3/14 713/300 |
| 2018/0059754 A1* | 3/2018 | Shaikh ..................... G06F 1/189 |
| 2018/0301906 A1 | 10/2018 | Qureshi |
| 2019/0350104 A1 | 11/2019 | Belady et al. |
| 2021/0344217 A1 | 11/2021 | Shaikh et al. |
| 2022/0197357 A1* | 6/2022 | Gao ........................ H02J 3/381 |
| 2022/0197358 A1* | 6/2022 | Gao ........................ H02S 40/30 |
| 2023/0054222 A1* | 2/2023 | Stokman ..................... H02J 1/04 |

FOREIGN PATENT DOCUMENTS

| | | |
|---|---|---|
| CN | 107800133 A | 3/2018 |
| CN | 108183545 B | 6/2018 |
| CN | 111384718 A | 7/2020 |
| CN | 112421603 A | 2/2021 |
| CN | 109936127 B | 8/2021 |
| EP | 3229360 A1 | 10/2017 |

OTHER PUBLICATIONS

Saravanan et al., "Design and Development of Multiple-Input Converter for Renewable Energy Integration", 2011 International Conference on Process Automation, Control and Computing, IEEE, Jul. 20, 2011, 6 pp.

* cited by examiner

AGGREGATING UNUSED POWER IN A FACILITY

TECHNICAL FIELD

The disclosure relates to power management and, more particularly, to aggregating available power capacity across multiple power sources or systems within a data center.

BACKGROUND

Data centers frequently include various electrical systems, such as server racks, backup components and infrastructure for power supply, data links, environmental controls (e.g., liquid cooling, air conditioning, fire suppression), and various security devices. The electricity demands of some of the electrical systems within the data center, such as server racks, are serviced by a multitude of independent electrical systems, each including power blocks connected to one or more sources. For example, the sources may include the electrical grid (e.g., a utility connection), fuel cells, solar cells, which provide power and may be backed up by alternate generation such as diesel generators. Typically, uninterruptible power supply (UPS), or multiple UPSs are installed in each power block to enable the system to provide continuous uninterruptable power to the load while the upstream electrical system transitions to next available source. Each block has a discrete maximum power capacity deliverable to a connected load (e.g., one or more server racks). Thus, the number of server racks, or other systems which demand power (for example mechanical systems) that may be connected to a given power block is determined by the maximum power capacity of the block and the aggregated power draw of each sources of load (for example server racks) connected to that block.

SUMMARY

In general, techniques of the disclosure are directed to aggregating, in a facility such as a data center, unused power from a multitude of independent electrical systems, each system including respective power blocks and each independent electrical system having potentially different power delivery capacities. The power demand for the facility is the sum of the maximum demand of the independent electrical systems versus the total of all the connected loads. A power block may include one or more connections to an electrical grid (e.g., a remote source such as a utility connection), fuel cells, or solar cells, and further may include a local power source such as diesel generators. Each power block is connected to one or more loads, which may include a multitude of server racks, each operating independently and having a combined peak power draw less than the power block capacity. It is common in a facility, such as a data center with multiple clients, the overall power demand is much less than the installed infrastructure capacity represented by the independent electrical systems. The power demand of the facility may fluctuate based on load demand, such as type of customer application, time of day, or other compounded factors.

Since each load operates independently, and rarely at peak power draw, from time-to-time some of the capacity of the power block will become stranded. The electrical systems powering the blocks are often asymmetrical thus sources are not able to be aggregated to leverage the sum of the remaining consolidated excess capacity and redistribute to other or new loads as needed. For example, a customer may want to add 10 new 60 kilowatt (kW) rack systems at the facility having 600 kW of capacity available between multiple independent blocks. However, although the facility has the total capacity available to accommodate, individual blocks may not be able to support 60 KW incremental load thus stranding power and not being able to support the 10 discrete loads. Conventionally, any excess AC power at each power block cannot be aggregated and redistributed to the new load.

This disclosure provides examples of use case techniques to aggregate unused power from a multitude of independent electrical systems in a facility. The power system may include a multitude of independent electrical systems comprising one or more power blocks that are connected to at least one converter that may include one or more rectifiers or inverters to convert source power (DC and/or AC) to a direct current (DC) power for distribution to one or more loads. For example, along with converting and aggregating AC to DC at a rectifier, one or more of the independent electrical systems may include a DC power output that may be connected to at least one DC to DC converter to aggregate any unused DC power from each power block. In another implementation, a variety of AC and DC sources are aggregated using a mixture of AC to DC and DC to DC converters and rectifiers to utilize unused power from each block. Each of a multitude of independent electrical systems in the data center has a maximum power output and is connected to a corresponding supply bus configured to provide an AC voltage from one or more AC generators of the power block to the converter, or in the case of a DC generator, a DC voltage to a DC to DC converter. Each converter may be connected to at least one DC bus and each DC bus may be connected to a multitude of loads in the facility (e.g., a co-located customer data center). In some examples, a power controller coupled to the converter is configured to utilize the unused power from each of the independent electrical systems and to allocate power to each of the plurality of independent loads based on power generation and consumption data, such as input power from each independent electrical system and power consumption from each of the plurality of independent loads, among other data.

The techniques described herein may provide one or more technical advantages. For instance, underutilized power stranded at each power block may be recaptured when aggregated to DC voltage and deployed to existing or new loads, thus maximizing the utilization of the power sources at the facility, such as the independent electrical systems, power storage devices, and UPSs. The advantages of aggregating unused power and rectifying or converting to DC power include, but are not limited to, increased in efficiency due to less heat rejection, less components than a conventional system and therefore more reliable, no synchronizing or load balancing among AC power sources, provides a source to each load free of harmonics, and is adaptable to energy storage systems (ESS) and fuel cells, which are natural DC devices. Additionally, power system solutions are scalable because converters may be added or subtracted based on changes to the facility, for example, expanding AC power and load capacity in a data center when adding additional server racks. Additional technical advantages include the ability to use more DC UPSs that are more energy and space efficient than conventional AC UPSs and are easier to integrate with other alternative energy sources such as fuel cells and energy storage systems that support microgrid architectures. The techniques described herein support the green data center initiative since there are fewer electrical transformations from the service entrance to each load of the data center.

In one example, a power supply system of a facility includes a plurality of independent electrical systems each comprising one or more power blocks, a converter comprising a plurality of inputs coupled to the plurality independent electrical systems and comprising a plurality of outputs coupled to a plurality of independent loads, the converter configured to aggregate the power output of each of the plurality of independent electrical systems and to output direct current (DC) power to the plurality of independent loads through the plurality of outputs based on the aggregated power, wherein the independent loads may be associated with a plurality of server racks in the data center. The power supply system further comprising, a power controller coupled to the converter and configured to allocate power to each of the plurality of independent loads based on input power from each of the plurality of independent electrical systems and power consumption from each of the plurality of independent loads.

In another example, a data center system a plurality of independent electrical systems each comprising one or more power blocks, wherein each power block is coupled to at least one of an electrical grid connection and one or more generator units and configured to provide a respective power output, a converter comprising one or more inputs coupled to the plurality of independent electrical systems and one or more outputs coupled to at least one power bus, the converter configured to aggregate power output of each of the plurality of independent electrical systems at the one or more inputs of the converter and to provide direct current power to the at least one power bus, and a plurality of independent loads associated with a corresponding plurality of customers of the data center, the plurality of independent loads coupled to the least one power bus to receive the direct current power from the converter. The data center system further comprising a power controller coupled to the rectifier and configured to allocate power to each of the plurality of independent loads based on input power from each of the plurality of independent electrical systems and power consumption from each of the plurality of independent loads.

In another example, a method comprises managing unused power in a facility by aggregating, at a converter, power output comprising at least one of alternating current (AC) power and direct current (DC) power provided by each of a plurality of independent electrical systems, providing DC power from the converter based on the aggregated power output to a plurality of independent loads, wherein power consumption of each of the plurality of independent loads is configurable, and allocating the DC power to each of the plurality of independent loads based on the power output provided by each of the plurality of independent electrical systems and power consumption from each of the plurality of independent loads.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1A:
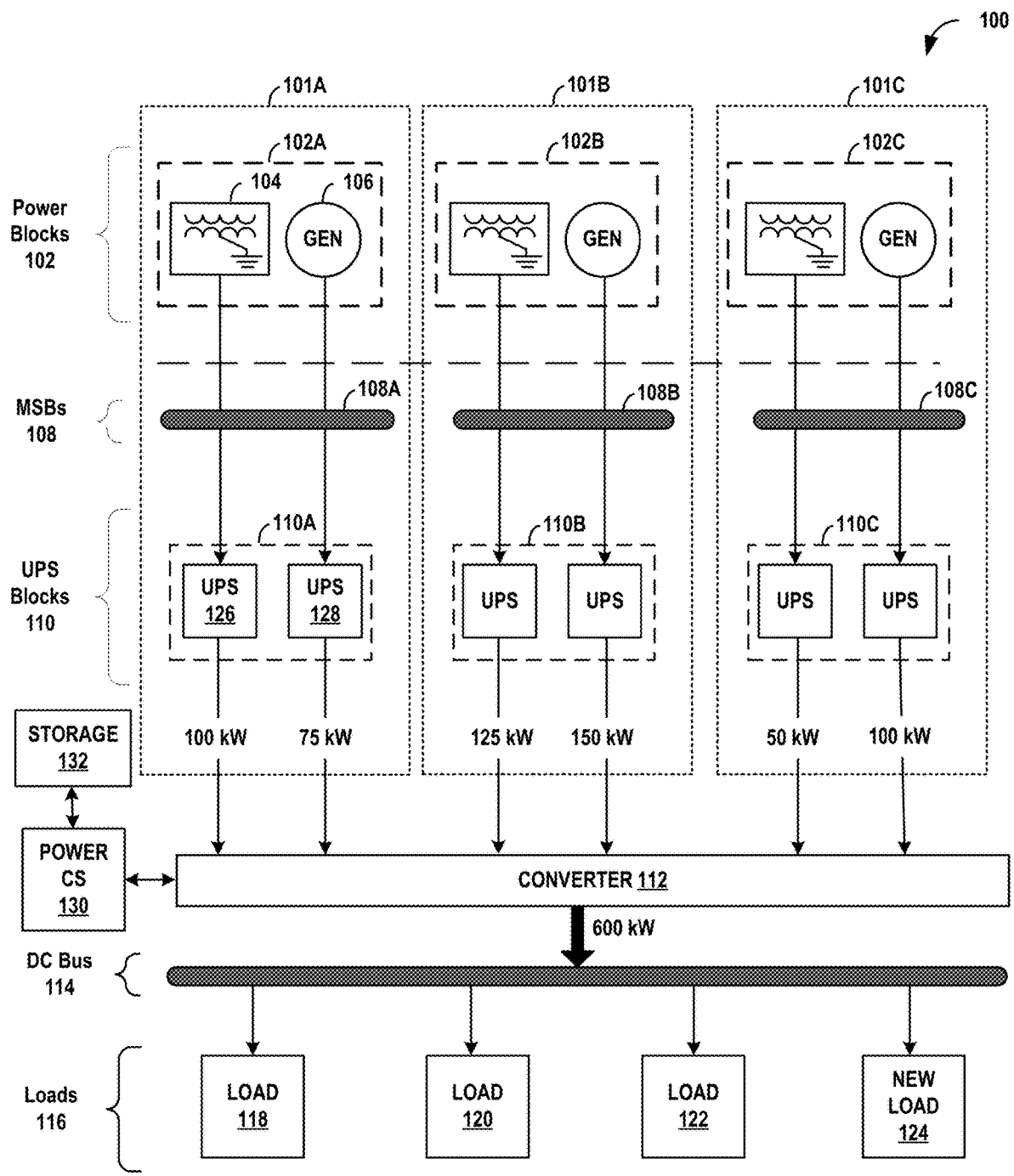
FIGS. 1A-1B are block diagrams that illustrate a power system to aggregate and distribute unused power in a facility in accordance with one or more techniques of the disclosure.

Electrical loads of a facility, such as a data center or other facility managing power for multiple independent loads like server racks, computing and routing equipment, etc., may be powered from multiple independent electrical systems (which may be asynchronous) to form one or more power blocks. Each power block includes one or more electrical grid connections (e.g., AC voltage from a power company), onsite generation (e.g., DC sources such as solar, fuel cells, etc.) and co-generators (e.g., AC generators) where each may directly connect to the loads or in parallel to uninterruptible power supplies (UPSs). The UPSs may normally draw power from the electrical grid connection or co-generator. During an intermittent power interruption (e.g., brownout, voltage surge, etc.), however, the UPSs may provide power to the independent loads of the facility using an energy storage device (e.g., battery, flywheel, etc.).

In a conventional system, for example, each independent electrical system of the facility may be connected to a UPS with a dedicated load, where the size of the load with respect to power draw (e.g., number of devices) is determined by the maximum power output of the independent electrical system. The one or more power blocks of each independent electrical system provides an AC voltage to the load, where each rack in the load includes a power distribution unit (PDU) to convert the AC voltage to DC voltage. However, the load associated with the power block rarely, if ever, reaches its maximum draw and normally operates at an average draw much less, for example, 60 percent of maximum. That is 40 percent of what the power block can deliver is not utilized thus wasting the capital expense of maintaining the maximum draw capacity in the form of provisioning the power from the utility company, maintaining co-generators and UPSs to meet maximum power, and provisioning cooling for the load based on the maximum power draw. For example, a typical data center facility includes a multitude of independent electrical system and their respective power blocks, each connected to a dedicated load as described above. Thus, the inefficiency and waste based on the underutilized power is multiplied depending on the size of the facility.

Techniques described herein improve the efficiency and minimizes the underutilization and waste of assets that provision power to independent loads. The independent loads may be associated with a corresponding multitude of loads, such as server racks that each have a unique power consumption and power utilization that may be managed by dedicated hardware and software of the facility. For example, in a data center of co-located customers where each customer is independent, the facility may have some or complete control of the power draw from the independent loads of each server rack based on service level agreements and how the power is shared within the facility. In some examples, the facility may throttle back processors of the server racks, stop, or change workloads of a server rack, or shut down large portions of infrastructure including a multitude of server racks to meet demand in other portions of the facility. This may be based on various criteria such as load prioritization based upon a service level agreements of customers, etc.

In one example, a data center facility may include a multitude of independent electrical systems including power blocks and UPSs connected to one or more converters that may include rectifiers and inverters to aggregate AC and DC power (if any) for distribution to a load. In addition to outputting DC power, the converter system may include an inverter to convert a portion of the DC power to AC power for certain loads or other uses within the facility. In one example, the converter receives and converts 480 volts AC to 380 volts DC. In other examples, the converter may also include a DC to DC converter to receive and output DC voltage from other power sources, such as storage devices such as batteries or UPSs configured to output DC power. The converter may be connected to one or more DC buses that may distribute the power to a multitude of independent loads of varying power requirements associated with the multitude of server racks in the facility.

In one example, in addition to aggregating and using underutilized power, a power control system may detect an increase in power use or additional draw (e.g., power surge) of power from the independent loads of each customer over what may be provided by the converter output and draw additional power from one or more UPSs or storage devices. In another example, the facility may include a multitude of power sources, such as independent electrical systems, UPSs, and storage devices (e.g., batteries), and the power control system may prevent an overload condition and overuse of any one power source by balancing and distributing power at the inputs and outputs of the converter and controlling power related parameters at the loads and independent electrical systems.

FIGS. 1A, 1B, 2 and 3 are block diagrams that each illustrate a power system to aggregate and distribute unused power in a facility, such as a data center, in accordance with one or more techniques of the disclosure. The facility as illustrated in any of the FIGS. 1 through 3 may be a facility to provide various different customers with physical infrastructure to operate their respective services. For example, the facility may house and power a multitude of different customers' electronic devices (e.g., independent loads) such as server racks comprising network devices, compute devices and storage devices, or any other suitable electronic devices. A facility may be deployed in a stand-alone building used primarily or exclusively for the facility or may be included in a portion of a larger building used for other uses such as office space, residential space, retail space, or any other suitable use. The facilities may be in an urban, suburban, or rural location or any other suitable location, and may provide an operating environment for co-location, interconnection, and/or other services. For example, a facility may provide an operating environment for any number of services that may be categorized according to service types, which may include, for example, software (i.e., applications), platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The independent loads may include one or more servers across a multitude of different server racks of the facility that respond to requests across a computer network to provide, or help to provide, a network or data service. In one example, the independent loads correspond to server racks provisioned to a multitude of customers. While the facility may control the power draw from the independent loads provisioned to a customer and how the power is distributed within the facility, the customers are separate and operate their services independently of the data center and each other. Each of the servers in the server racks may include one or more processors that execute software that can accept requests from clients, and may include one or more of a database server, file server, mail server, print server, web server, gaming server, application server, communication server, compute server, media server, or any other suitable type of server that may be employed by a data center provider or tenant of the data center provider (e.g., co-located customers), according to particular needs. Such servers may be specialized or general-purpose devices. For example, the serves may represent x86 or other real or general-purpose servers configured to apply and/or offer services to customers. The servers may also include special-purpose appliances or containers for providing interconnection services between customers of a co-location facility provided by the data center for providing any other suitable services according to particular needs. The servers may use any suitable operating system including Unix-like open source distributions, such as those based on Linux and FreeBSD, Windows Server, or any other suitable operating system.

The facility 100 of FIG. 1A includes independent electrical systems 101A-C including power blocks 102A-C, main switchboards (MSB) 108A-C, UPS blocks 110A-C, converter 112, (AC to DC), DC Bus 114, and loads 116.

In one example, facility 100 optionally includes a power control system 130 that may detect changes in power use and alters the power consumption of one or more components of facility 100, discussed in further detail below. Independent electrical systems 101A-C include power blocks 102A, 102B, and 102C, and each power blocks 102A-C may include an electrical grid connection and a connection to one or more generator units, for example, electrical grid connection 104 and generator unit 106 of power block 102A. Each power block of power blocks 102 is connected to a respective master switchboard of MSBs 108A, 108B, and 108C. For example, power block 102A is connected to MSB 108A such that the power at MSB 108A is either the power output of electrical grid connection 104 or of generator unit 106 of power block 102A.

UPS blocks 110 are optional and may be configured to supply uninterrupted power to loads 116 through converter 112 using previously stored power from electrical grid connection 104 and generator unit 106. For example, UPS blocks 110A, 110B, and 110C may provide electrical power to loads 116 through converter 112 and DC bus 114 during fluctuations in power, such an increase in power use by one or more loads drawing additional power, power outages or reductions from one or more power blocks 102, etc. Examples of UPS blocks 110 may include various combinations of mechanical energy storage systems (e.g., flywheel), electrical energy storage systems (e.g., capacitor, super capacitors), electrochemical energy storage systems (e.g., batteries), or other types of energy storage systems. In other examples, there may be none, fewer, or more components of UPS blocks 110 (e.g., UPS 126) that are connected to converter 112, and may not back up each power block on a one to one basis. For example, total power output of power block 102A may be 175 kW but UPS 126 and UPS 128 may total 100 kW or less.

In one example, electrical grid connection 104 of power block 102A may provide 100 kW of power through MSB 108A through UPS block 110A to converter 112 . . . . In this example, UPS 126 and UPS 128 are connected to MSB 108 which may be connected to electrical grid connection 104 or generator unit 106, respectively. UPS 110 or storage 132 may store energy to be later used for outages or support transient load increases, as diagrammed in FIG. 1A and discussed above. In a similar fashion, as illustrated in FIG. 1A, power blocks 102B and 102C are connected to a respective supply bus connected to UPS blocks 110B and 110C and provide power from their respective electrical grid connections or generators to converter 112. Thus, in this example, a total of 600 kW may be provided from independent electrical systems 101A-C to loads 116 through converter 112 and DC bus 114. In one example to provide up to the maximum total power, the power drawn from each independent electrical systems 101A-C would include a single source from each independent electrical system's a power block (e.g., electrical grid connection 104) combined with its other source's (e.g., generator 106) UPS power output (e.g., UPS 128). In some examples, UPS blocks 110 may be used accommodate changes in power requirements from loads 116, such as transient load increases from one or more of loads 116 or outages of one or more power blocks 102.

As discussed above, a conventional data center power system connects each power block to its own load. Average power demand is often less than plant design capacity resulting in unused power from each power block. For example, load 118 may have an average power draw of 125 kW and maximum draw of 175 kW, and in a conventional system, is paired solely with power block 102A. Similarly, load 120 with an average power draw of 200 kW and maximum draw of 275 kW, and load 122 with an average power draw of 100 kW and maximum draw of 150 kW, in a conventional system would be connected solely to independent electrical systems 101B and 101C, respectively. A given facility may have 50 KW, 75 kW, and 50 kW of unused power available totaling 175 kW to support additional load. However, if the new load of over 75 kW could not be accommodated in a conventional system.

Unlike a conventional system, techniques described herein include a rectification system (e.g., converter 112) to aggregate the power of each independent electrical system such that the data center may use the stranded power from each independent electrical system to accommodate additional loads over the conventional system design. For example, in FIG. 1A the total power output at converter 112 and on to DC bus 114 is 600 kW but the average power draw of loads 118-120 is 425 kW. Thus, new load 124 may be added that has a power draw of up to 175 kW (600 kW-425 kW).

In one example when UPS blocks 110 are connected to converter 112, the UPS blocks 110 may provide power when the power draw is over the average power draw from any of loads 118-122 and new load 124. In this example, converter 112 may take either AC input from UPS blocks 110 or DC from external storage source 132. For simplicity, FIG. 1A illustrates using a single converter 112, but it is not limited to such. In other examples, converter 112 may be two or more converters connected to any combination of power blocks 102 and UPS blocks 110, and thus has a technical advantage of scaling to any number of new or additional power blocks as facility 100 increases capacity. In another example, in addition to outputting DC power, the converter 112 may include an inverter to convert a portion of the DC power to AC power for certain loads or other uses within the facility.

In one example, power control system 130 includes a power controller (not shown, see e.g., FIG. 4) that may receive input such as data and other input from each load, each independent electrical system, or facility 100 components such as storage 132 or external user input. Certain input may provide indications of changes in power use among loads 116 and accordingly manage power utilization such as power to and from one or more components of facility 100. For example, power control system 130 may receive an indication one or more loads 116 (e.g., server racks) are approaching an upper power limit, such as may happen in a period of transient load increase. Power control system 130, in anticipation of, or in response to increase in utilization, may draw additional DC power from storage 132 to provide additional power to the load to accommodate the transient load increase. In another example, power control system 130 may load balance between UPS blocks 110 and storage 132 to meet demand based on power system parameters, such as type of power storage (e.g., AC or DC), recharge time of a UPS block, and type of power source connected to a UPS block (e.g., generator block, electrical grid, fuel cell).

In another example, power control system 130 may monitor the power storage devices (e.g., storage at UPS blocks 110 and storage 132) and periodically obtain power measurements from converter 112 and the co-located customer loads (e.g., loads 116). When the available capacity at DC bus 114 gets low, power control system 130, in addition to the option to draw more power from storage 132 and optionally from UPS blocks 110 (storage), may send a command to throttle down (e.g., server CPUs) and reduce overall power draw from one or more of loads 116 to stabilize power on DC bus 114. For example, by regulating the power demand from one or more of loads 118-124 to reduce power consumption. Although power control system 130 as illustrated herein is coupled to components of facility 100 through converter 112, it may be connected to other components such as power blocks 102, UPS blocks, and loads 116 directly and by any means, such as by power bus, dedicated line, or wirelessly. In another example, in addition to load balancing among all loads 116, power control system 130 may load balance outputs of converter 112 by controlling power consumption within a single load (e.g., a single server rack of load 118).

Figure 1B:
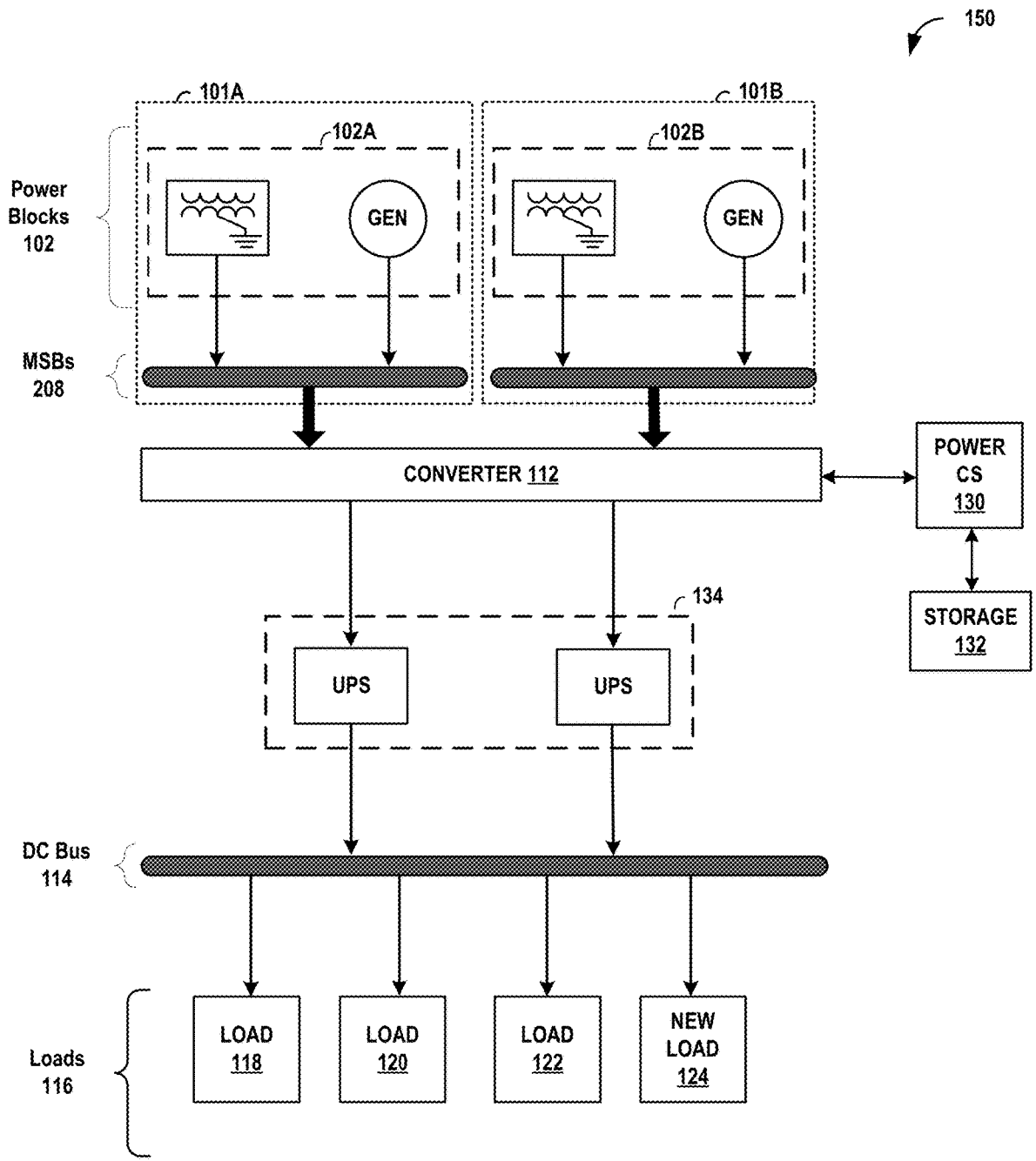

FIG. 1B illustrates an example of converter 112 connected upstream of the UPS blocks, such as UPS block 134 and UPS block 136. In this example, converter 112 and DC Bus 114 may be connected upstream between power blocks 102A and 102B through MSB 208 and UPS block 134, including a direct connection to DC bus 114. Like FIG. 1A, the power system of facility 150 aggregates the power of each independent electrical system 101A and 101B such that facility 150 may use stranded power that would result from a conventional data center power system as discussed above. In other examples converter 112 may be two or more converters connected to any combination of power blocks 102 and UPS block 134 and provide a technical advantage of scaling to any number of new or additional power blocks as facility 150 increases capacity. Some or all of the converters may include an inverter to convert a portion of the DC power to AC power for certain loads or other uses within the facility 100.

Similar to FIG. 1A, the power control system 130 may receive input such as data and other input from each load, each independent electrical system, or facility 150 components such as storage 132 or external user input. Certain input may provide indications of changes in power use among loads 116 and accordingly manage power utilization such as power to and from one or more components of facility 150. For example, power control system 130 may receive an indication loads 116 (e.g., server racks) is approaching an upper power limit, such as may happen during a transient load increase. Power control system 130, in anticipation of, or in response to the increased power utilization, may draw additional DC power from storage 132 to provide additional power to the load to accommodate the overload. In another example, power control system 130 may load balance between UPS block 134 and storage 132 to meet demand based on power system parameters, such as type of power storage (e.g., AC or DC), recharge time of a UPS block, and type of power source connected to a UPS block (e.g., generator block, electrical grid, fuel cell). In another example, power control system 130 may use in addition to or instead of storage 132, UPS block 134 to meet the increased power demand. In another example, When the available capacity at DC bus 114 gets low, power control system 130, in addition to the option to draw more power from storage 132 and UPS block 134, may send a command to customer loads (e.g., server CPUs) to throttle down to reduce the overall power draw from one or more of loads 116 and keep the busload at DC bus 114 constant. For example, by regulating the power demand from one or more of loads 118-124 to reduce power consumption. Although power control system 130 as illustrated herein is coupled to components of facility 150 through converter 112, it may be connected to other components such as power blocks 102, UPS block 134, and loads 116 directly, and by any means, such as by power bus, dedicated line, or wirelessly.

Figure 2:
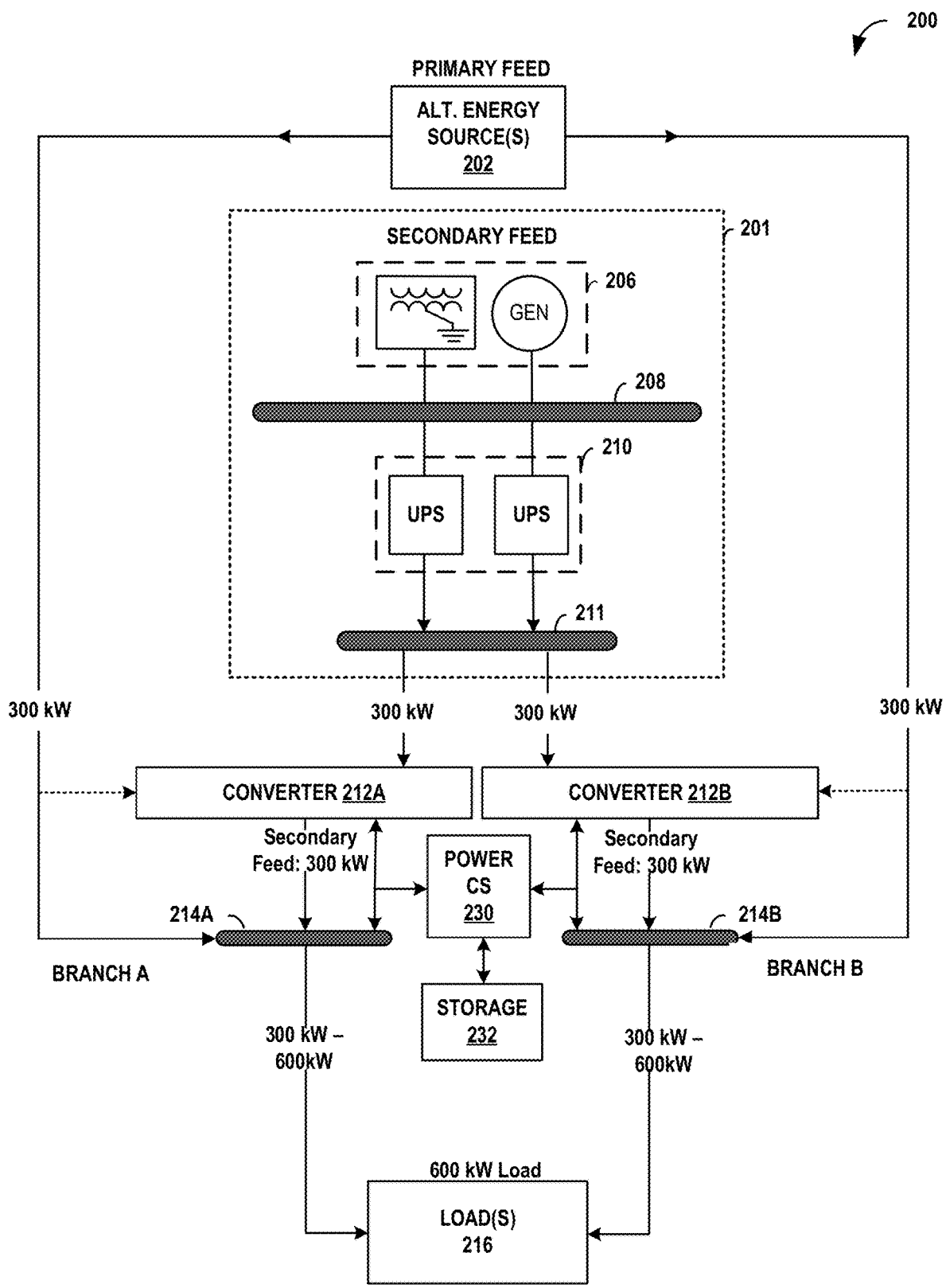
FIG. 2 is a block diagram illustrating an integration of a fuel cell into the topology of a power system in accordance with one or more techniques of the disclosure.

FIG. 2 is a block diagram illustrating an integration of a fuel cell into a power system topology of a facility in accordance with one or more techniques of the disclosure. Facility 200 includes alternative energy source 202 that has one 300 kW output connected to DC bus 214A and another 300 kW output connected to DC bus 214B. DC bus 214A and DC bus 214B are connected to load 216 and provide a total of 600 kW from alternative energy source 202. For simplicity, load 216 is illustrated in a single block. For example, load 216 may include a multitude of devices (e.g., server racks) of different co-located customers in facility 200, similar to examples illustrated in FIGS. 1A and 1B.

Facility 200 includes independent power system 201 as a secondary feed to the primary feed including alternative energy source 202. Independent power system 201 includes power block 206 connected to MSB 208, which is connected to UPS block 210. UPS devices of UPS block 210 are connected to converter 212A and converter 212B through supply bus 211. In other examples, independent power system 201 may include additional components, such as one or more combinations of power blocks, buses, and UPS blocks. Independent power system 201 may provide secondary power feeds of up to 300 kW from each converter 212A and 212B when either branch A or branch B fails from alternative energy source 202. For example, branch A from alternative energy source 202 fails or DC bus 214A fails, an additional 300 kW of power may be drawn from independent power system 201 through converter 212B to add to the 300 kW of branch B to total 600 kW to the load 216.

Power control system 230 may receive input such as data and other input from each load, each independent electrical system, or facility 200 components such as storage 232 or external user input. Certain input may provide indications of changes in power use among load 216 and accordingly manage power utilization such as power to and from one or more components of facility 200.

Power control system 230 may monitor power storage devices (e.g., storage 232, independent power system 201) and periodically obtain power measurements from converter 212 and load data (e.g., from load 216) to detect changes in power use. In some examples, power control system 230 may manage independent power system 201 and converters 212A and 212B to provide additional power during a period of increased power utilization from the load 216 or when a failure is detected, such as loss of power from a branch or bus failure (e.g., branch A or DC bus 214A). Power control system 230 may balance the power draw from each converter 212A and 212B, such as drawing a secondary power feed of 150 KW from converter 212A and 150 KW from converter 212B to cover a loss of a 300 kW branch (e.g., branch B) from alternative energy source 202 to maintain a stable power supply of 600 kW to load 216. The power control system 230 may draw power from one or both of storage 232 or converter 212A and 212B during power demand surges from load 216. In other examples, independent power system 201 may not be included in facility 200 and branch A and branch B may optionally terminate into respective converters 212A and 212B (see dashed lines) and controlled and balanced by power control system 230. If omitted, each feeder from 202 would be designed to support the full 600 kW In yet another example, power control system 230 may send a command to one or more customer loads (e.g., server CPUs) of load 216 to regulate the power demand from load 216, such as to throttle down to reduce the overall power draw from load 216 to maintain power stability at DC bus 214A and 214B. As such, facility 200 provides a technical advantage over conventional system by utilizing unused or stranded power from independent power system 201 and storage 232 through converters 212A and 212B to increase load capacity, for example, by accommodating increased power utilization and actively managing load 216 and power distribution within facility 200.

Figure 3:
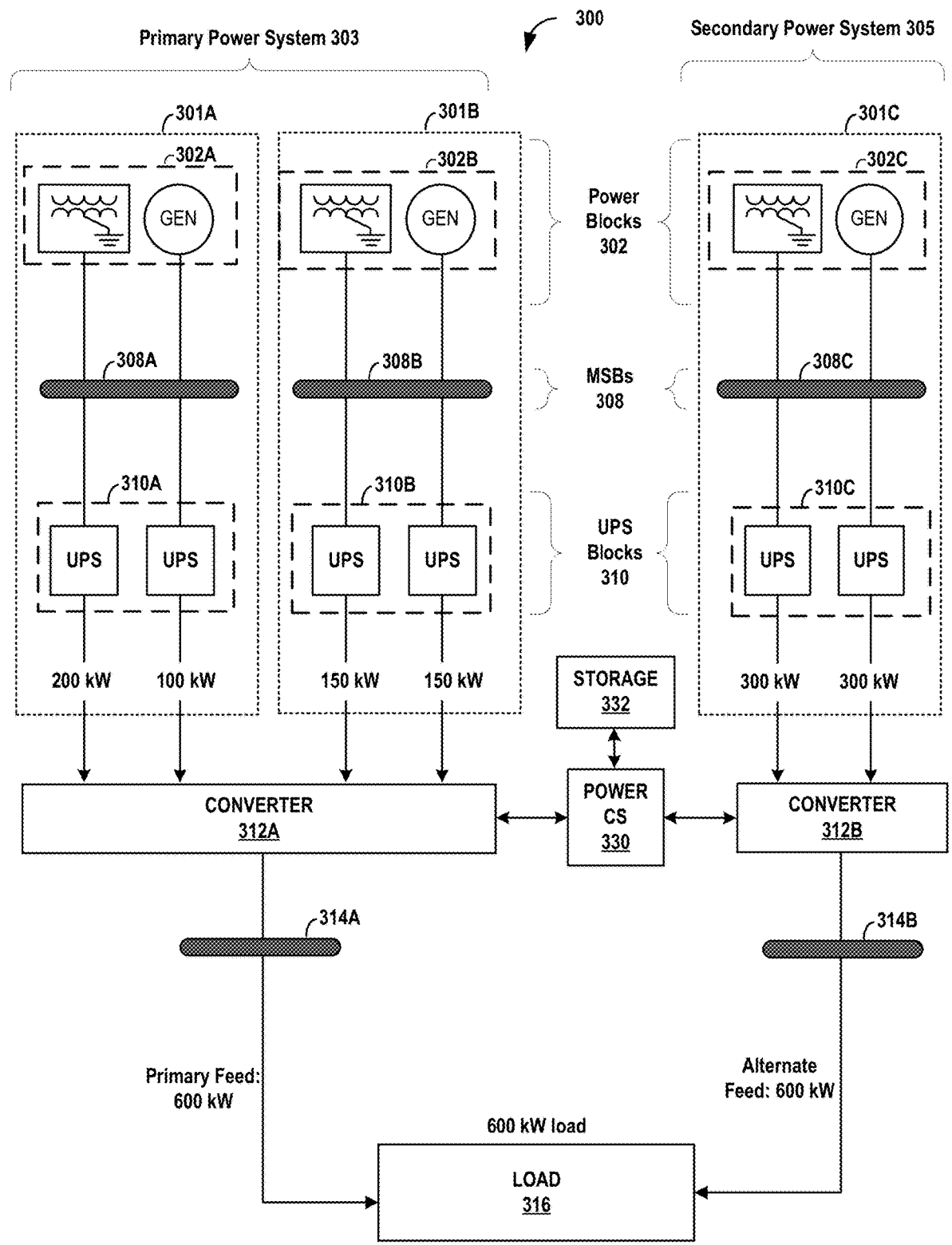
FIG. 3 is a block diagram illustrating an integration of a backup power system into the topology of a power system in accordance with one or more techniques of the disclosure.

FIG. 3 is a block diagram illustrating an integration of a secondary power system into a power system topology of a facility 300 in accordance with one or more techniques of the disclosure. Facility 300 includes independent electrical systems 301A to 301C, which include power blocks 302, MSBs 308, and UPS systems 310. Primary power system 303 includes independent electrical systems 301A to 301C, that respectively connect to converters 312A to 312B. Although two converters are illustrated in this example, in other examples there may be a multitude of converters where each converter may be connected in parallel to all or in combination with each of the facility's independent electrical systems (e.g., independent electrical systems 301A to 301C).

Primary power system 303 operates in a similar fashion to that illustrated in FIG. 1A. Primary power system 303 is configured to utilize the aggregated power from each UPS blocks 310A and 310B through converter 312A respectively to DC bus 314A. DC bus 314A is connected to load 316 and supplies the load with the primary power feed, in this example, 600 kW. For simplicity, load 316 is illustrated in a single block. For example, load 316 may include a multitude of devices (e.g., server racks) of different co-located customers in facility 300, similar to examples illustrated in FIGS. 1A and 1B.

Facility 300 includes secondary power system 305 that includes power block 302C connected to MSB 308C, which is connected to UPS block 310C. The UPS systems of UPS block 310C are connected to converter 312B connected to DC bus 314B. In one example, secondary power system 305 may provide a secondary power feed of additional power up to 600 kW from converter 312B when the primary power feed from primary power system 303 fully or partially fails. In other examples, secondary power system 305 may include additional components, such as one or more combinations of power blocks, buses, and UPS blocks.

Power control system 330 may monitor power storage devices (e.g., storage 332, UPS blocks 310) and periodically obtain power measurements from converter 312A and converter 312B, and load 316 to detect changes in power use or such as loss of power from a branch or bus failure (e.g., primary feed or DC bus 314A). Power control system 330 may balance the power draw from each converter 312A and 312B, such as drawing a secondary power feed of 300 kW from converter 312B to cover a loss of power from primary power system 303. In other examples, the power control system 330 may draw power from one or both of storage 332 and converter 312B during power demand surges from load 316 or component failures within primary power system 303. As with the converters of FIGS. 1A, 1B and 2, in addition to outputting DC power, one or more of converters 312A and 312B may include an inverter (not shown) to convert a portion DC power to AC power for certain loads or other uses within the facility 300.

In yet another example, power control system 330 may send a command to one or more customer loads (e.g., server CPUs) of load 316 to regulate the power demand from load 316, such as to throttle down to reduce the overall power draw from load 316 to balance and maintain power stability of facility 300. As such, facility 300 provides a technical advantage over conventional system by utilizing unused or stranded power from secondary power system 305 and storage 332 through converters 312A and 312B to increase load capacity, for example, by accommodating increased power demand and actively managing load 316 and power distribution within facility 300.

Figure 4:
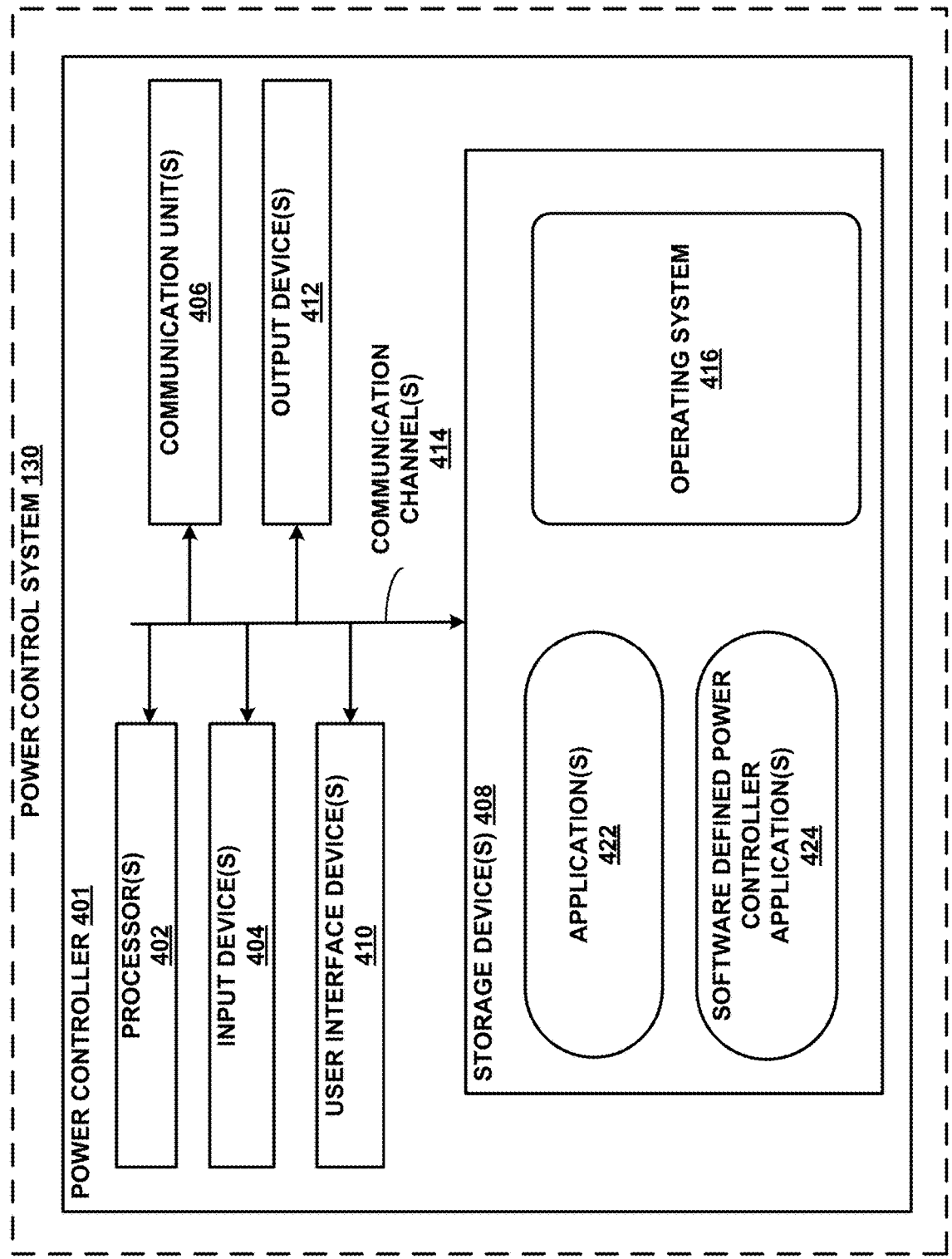
FIG. 4 is a block diagram illustrating a power control system in accordance with one or more techniques of the disclosure.

FIG. 4 is a block diagram illustrating a power control system in accordance with one or more techniques of the disclosure. Power control system 130, 230, and 330 as discussed throughout this disclosure are examples of special-purpose computing devices. FIG. 4 shows an example power control system 130 including power controller 401. Aspects and techniques ascribed to power control system 130 and power controller 401 may also apply to power control systems 230 and 330, in accordance with one or more techniques of the disclosure. FIG. 4 is an example of power control system 130 configured for allocating aggregated data center power capacity (e.g., facility 100), including from UPS blocks and battery devices that would otherwise be unused and stranded, in accordance with one or more techniques of the disclosure. Power controller 401 of power control system 130 may include a server or other computing device that includes one or more processor(s) 402 for executing various software components, such as applications 422, software defined power controller application 424, and operation system 416. Although shown in FIG. 4 as a stand-alone power control system 130 for purposes of example, a computing device may be any component or system that includes one or more processors or other suitable computing environment for executing software instructions and, for example, may include more or less elements than illustrated in FIG. 5. For example, communication units 406, and in some examples, components such as storage device(s) 408 may or may not be co-located or in the same enclosure as other components.

Processor(s) 402, in one example, is configured to implement functionality and/or process instructions for execution within power controller 401. For example, processors 402 may be capable of processing instructions stored in storage device 408. Examples of processors 402 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within power controller 401 during operation. Storage device 408 may include any one or combination of a disk drive, optical drive, and/or memory (such as flash memory, random access memory or RAM) or any other type of volatile or non-volatile memory, that stores instructions to cause, when executed, one or more processors to perform the techniques described herein.

Power controller 401, in some examples, also includes one or more communication units 406. In one example, power controller 401 utilizes communication units 406 (e.g., network interface card, wireless transceiver, etc.) to communicate with external devices via one or more networks, such as one or more wired/wireless/mobile networks (not shown), communication channel 414, etc. In some examples, power controller 401 may use communication unit 406 to communicate with an external device, such as converter 112, UPS blocks 110, storage 132, or any component within or external to facility 100. For example, power controller 401 of power control system 130 may receive a communication from a device or system (e.g., server or rack system of loads 116) in facility 100 that indicates an amperage, voltage, power, or other signal that may be further processed by power controller 401 (e.g., by applications 422, software defined power controller application 424). Depending on implementation, digital signaling techniques, analog signaling techniques, or any combination thereof, may be used by power control system 130 for the purpose for allocating aggregated data center power capacity (e.g., facility 100), including from UPS blocks and battery devices that would otherwise be unused and stranded, in accordance with one or more techniques of the disclosure.

Power controller 401 may also include one or more user interface devices 410. User interface devices 410, in some examples, may be configured to receive input from a user through tactile, audio, or video feedback. Examples of user interface device(s) 410 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 412 may also be included in power controller 401. Output device 412, in some examples, is configured to provide output to a user using tactile, audio, or video stimuli. Output device 412, in one example, includes a presence-sensitive display, a sound card, a video graphics adapter card, or any other type of device for converting a signal into an appropriate form understandable to humans or machines. Additional examples of output device 412 include a speaker, a cathode ray tube (CRT)

monitor, a liquid crystal display (LCD), or any other type of device that can generate intelligible output to a user.

Figure 5:
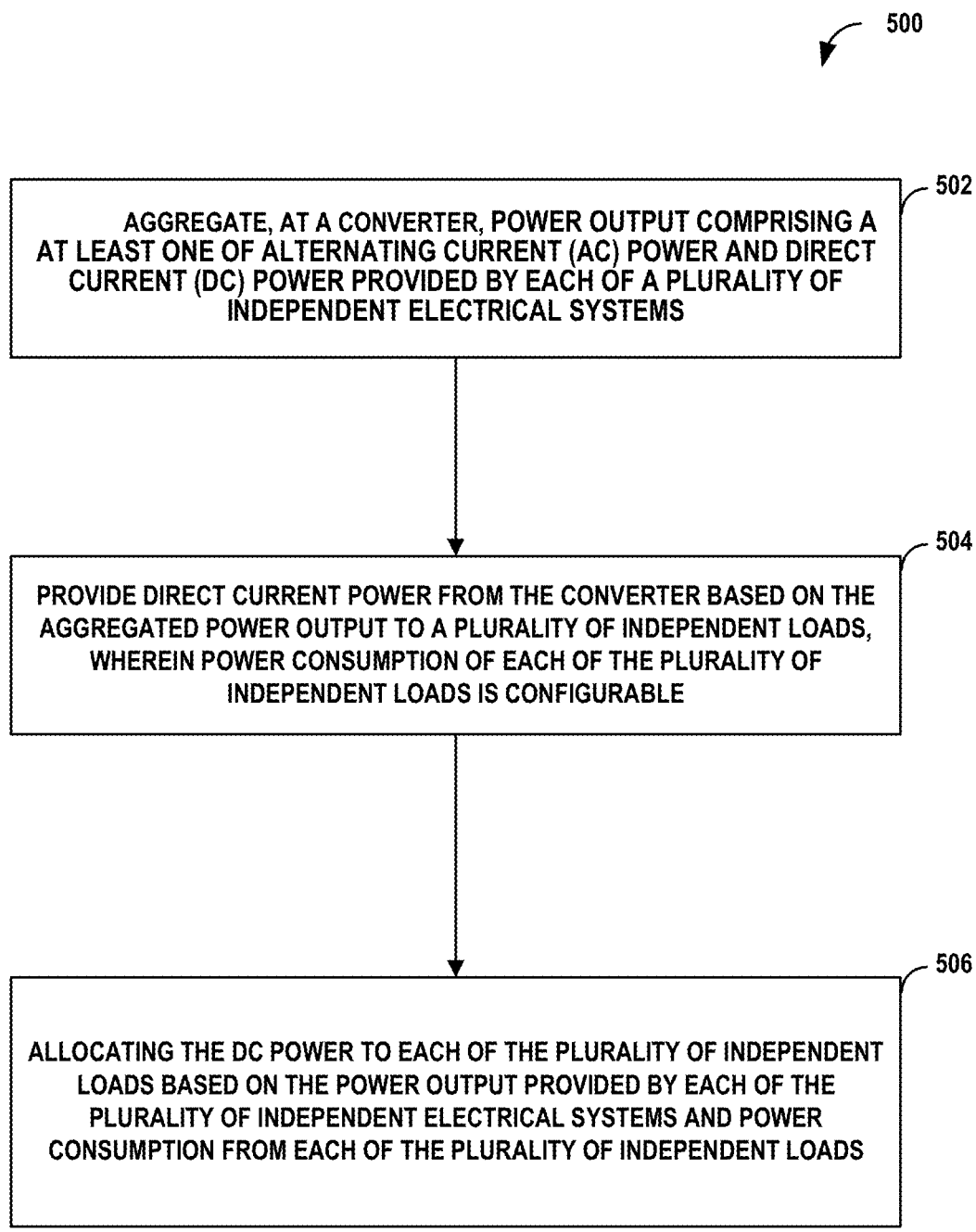
FIG. 5 is a flow chart illustrating an example method for aggregating and using underutilized power from one or more independent electrical systems, UPSs, or power storage devices, in accordance with one or more techniques of the disclosure.

FIG. 5 is a flow chart illustrating an example method 500 for aggregating and using underutilized power from one or more power blocks, UPSs, or storage batteries, in accordance with one or more techniques of the disclosure. FIG. 5 is discussed in relation to FIG. 1 through FIG. 4, for exemplary purposes only. In one example, the method is implemented in a facility (e.g., data center) to provide, for example, independent customers hardware to run their services, such as applications on server racks.

Initially, converter 112 may aggregate, power output comprising at least one of alternating current (AC) power and direct current (DC) power provided by each of a plurality of independent electrical systems 101 (502). The converter 112 may provide DC power based on the aggregated power output to a plurality of independent loads 116, wherein power consumption of each of the plurality of independent loads 116 is configurable (504). Power control system 130 may allocate the DC power to each of the plurality of independent loads 116 based on the power output provided by each of the plurality of independent electrical systems 101 and power consumption from each of the plurality of independent loads 116 (506).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A power supply system comprising:
 a plurality of independent electrical systems, each comprising one or more power blocks, wherein each power block is configured to provide a respective power output;
 a converter comprising a plurality of inputs connected to the one or more power blocks of the plurality of independent electrical systems and comprising a plurality of outputs connected to a plurality of independent loads, the converter configured to aggregate power output of each of the plurality of independent electrical systems and to output direct current (DC) power to the plurality of independent loads through the plurality of outputs based on the aggregated power output; and
 a power controller connected to the converter and configured to allocate power to each of the plurality of independent loads based on input power from each of the plurality of independent electrical systems and power consumption from each of the plurality of independent loads, wherein to allocate the power, the power controller is further configured to:
  determine that power consumption of an independent load of the plurality of independent loads has increased; and
  based on the determination that the power consumption of the independent load has increased, redistribute power to the independent load from a power block associated with a different independent load.

2. The power supply system of claim 1, further comprising one or more uninterruptible power supply (UPS) blocks connected between a respective power block of the one or more power blocks and the converter, the UPS blocks each configured to provide power to the converter.

3. The power supply system of claim 2, wherein the power controller is further configured to:
 detect a power outage from one or more of the plurality of independent electrical systems or a transient demand increase from the plurality of independent loads; and
 in response, draw additional power from at least one of the UPS blocks or a power storage system connected to the converter to provide to the plurality of independent loads.

4. The power supply system of claim 3, wherein the power storage system is a battery system.

5. The power supply system of claim 1, wherein the converter further comprises an inverter configured to convert direct current to alternating current.

6. The power supply system of claim 1, wherein the power controller is further configured to;
 allocate, to one or more independent loads, at least a portion of unused power,
 comprising at least one of AC power or DC power from one or more uninterruptible power supply (UPS) blocks connected to the converter.

7. The power supply system of claim 1, wherein the power controller is connected to the plurality of independent loads and is further configured to manage power utilization of each load of the plurality of independent loads.

8. The power supply system of claim 7, wherein to allocate power to each of the plurality of independent loads, the power controller is further configured to regulate power demand associated with one or more of the plurality of independent loads.

9. The power supply system of claim 1, wherein the converter comprises a first converter and a second converter, wherein the first converter is connected to one of the plurality of independent electrical systems and is configured to provide a primary power feed, and wherein the second converter is connected to another one of the plurality of independent electrical systems and is configured to provide a secondary power feed.

10. The power supply system of claim 9, wherein the power controller further configured to:
draw additional power from a power storage system connected to the converter based on the determined increase in power consumption of the independent load.

11. The power supply system of claim 1, further comprising:
a fuel cell comprising a first power output connected to a first DC bus and a second power output connected to a second DC bus, the fuel cell configured to provide a primary power feed to the plurality of independent loads, and
wherein the converter comprises a first converter connected to the first DC bus and a second converter connected to the second DC bus, the first converter and the second converter connected to one or more of the plurality of independent electrical systems and configured to provide a secondary power feed to the plurality of independent loads.

12. A data center comprising:
a plurality of independent electrical systems each comprising one or more power blocks, wherein each power block is connected to at least one of an electrical grid connection and one or more generator units and configured to provide a respective power output;
a converter comprising one or more inputs connected to the one or more power blocks of the plurality of independent electrical systems and one or more outputs connected to at least one power bus, the converter configured to aggregate power output of each of the plurality of independent electrical systems at the one or more inputs of the converter and to provide direct current power to the at least one power bus;
a plurality of independent loads associated with a corresponding plurality of customers of the data center, the plurality of independent loads connected to the least one power bus to receive the direct current power from the converter; and
a power controller connected to the converter and configured to allocate power to each of the plurality of independent loads based on input power from each of the plurality of independent electrical systems and power consumption from each of the plurality of independent loads, wherein to allocate the power, the power controller is further configured to:
determine that power consumption of an independent load of the plurality of independent loads has increased; and
based on the determination that the power consumption of the independent load has increased, redistribute power to the independent load from a power block associated with a different independent load.

13. The data center of claim 12, further comprising one or more uninterruptible power supply (UPS) blocks connected between a respective power block of the plurality of power blocks and the converter, the UPS blocks each configured to provide power from the respective power block to the converter.

14. The data center of claim 13, wherein the power controller is further configured to:
detect a power outage from one or more of the plurality of independent electrical systems or a power surge from the plurality of independent loads; and
in response, draw additional power from at least one of the UPS blocks or a power storage system connected to the converter to provide to the plurality of independent loads.

15. The data center of claim 12, wherein the power controller is further configured to;
allocate, to the one or more independent loads, at least a portion of unused power
from a storage device connected to the converter.

16. The data center of claim 12, wherein the power controller is further configured to:
allocate, to the one or more independent loads, at least a portion of unused power comprising at least one of AC power or DC power from one or more uninterruptible power supply (UPS) blocks connected to the converter.

17. The data center of claim 12, wherein the power controller is connected to the plurality of independent loads and is further configured to manage power utilization of each load of the plurality of independent loads.

18. The data center of claim 12, wherein the converter comprises a first rectifier and a second converter connected to one or more power blocks of the plurality of power blocks, wherein the second converter is configured to provide an alternate power feed to the plurality of independent loads.

19. The data center of claim 18, wherein the power controller is further configured to draw additional power from the second converter based on an increase in power consumption of the independent load.

20. A method of managing unused power in a facility, the method comprising:
aggregating, at a converter, power output comprising at least one of alternating current (AC) power and direct current (DC) power provided by each of a plurality of independent electrical systems;
providing DC power from the converter based on the aggregated power output to a plurality of independent loads, wherein power consumption of each of the plurality of independent loads is configurable; and
allocating the DC power to each of the plurality of independent loads based on the power output provided by each of the plurality of independent electrical systems and power consumption from each of the plurality of independent loads, wherein allocating the DC power further comprises:
determining that the power consumption of an independent load of the plurality of independent loads has increased; and
based on the determination that the power consumption of the independent load has increased, redistribute power to the independent load from a power block associated with a different independent load.

* * * * *